United States Patent
Weaver

[11] Patent Number: 5,969,528
[45] Date of Patent: Oct. 19, 1999

[54] DUAL FIELD METAL DETECTOR

[75] Inventor: Brent Charles Weaver, Heath, Tex.

[73] Assignee: Garrett Electronics, Inc., Garland, Tex.

[21] Appl. No.: 09/012,148

[22] Filed: Jan. 22, 1998

[51] Int. Cl.[6] .............................. G01V 3/11; G01V 3/165
[52] U.S. Cl. ................... 324/329; 324/232; 324/243
[58] Field of Search .................... 324/326–329, 324/334, 232, 239–243; 340/551

[56] References Cited

U.S. PATENT DOCUMENTS

| | | | |
|---|---|---|---|
| D. 274,704 | 7/1984 | Garrett et al. | D10/47 |
| 2,160,356 | 5/1939 | Fore et al. | 324/329 |
| 2,451,596 | 10/1948 | Wheeler | 324/334 X |
| 2,938,163 | 5/1960 | Roffman et al. | 324/37 |
| 3,165,691 | 1/1965 | McClanahan | 324/243 X |
| 3,526,886 | 9/1970 | Lubich | 340/282 |
| 3,662,255 | 5/1972 | Garrett | 324/3 |
| 3,686,564 | 8/1972 | Mallick et al. | 324/41 |
| 3,697,996 | 10/1972 | Elder et al. | 343/101 |
| 3,882,374 | 5/1975 | McDaniel | 324/329 |
| 3,938,125 | 2/1976 | Benassi | 340/280 |
| 3,950,696 | 4/1976 | Miller et al. | 324/41 |
| 4,053,828 | 10/1977 | Ambler et al. | 324/41 |
| 4,274,090 | 6/1981 | Cooper | 340/572 |
| 4,348,639 | 9/1982 | Karbowski | 324/329 |
| 4,605,898 | 8/1986 | Aittoniemi et al. | 324/232 |
| 4,686,471 | 8/1987 | Morita et al. | 324/243 |
| 4,779,048 | 10/1988 | Aichele | 324/207 |
| 5,038,106 | 8/1991 | Mamontov et al. | 324/329 |
| 5,039,946 | 8/1991 | Mamontov et al. | 324/329 |
| 5,406,259 | 4/1995 | Manneschi | 340/561 |
| 5,521,583 | 5/1996 | Frahm et al. | 340/551 |
| 5,721,489 | 2/1998 | Weaver et al. | 324/329 |

*Primary Examiner*—Gerard Strecker
*Attorney, Agent, or Firm*—Sidley & Austin

[57] ABSTRACT

A metal detector has multiple transmit and receive coils for producing multiple detection fields. In one embodiment, a transmit coil is combined with two receive coils in a configuration that enables the detector to generate two detection fields, one being substantially narrower than the other. The transmit coil is inductively balanced with the receive coils such that the transmit coil induces minimum signals in each of the two receive coils. A metal target lying within a detection field changes the coupling between transit and receive coils and produces signals in the receive coils. The received signals are utilized to identify the target's presence within one or both of the detection fields. The use of two detection fields, substantially different in size, enables the metal detector to search over a broad area for object detection and then narrow the search to more precisely locate the detected object. A further embodiment has two transit coils and one receive coil and likewise produces a broad and a narrow detection field.

18 Claims, 3 Drawing Sheets

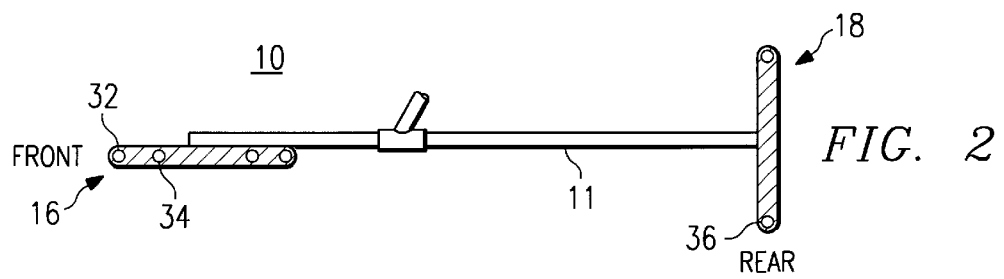
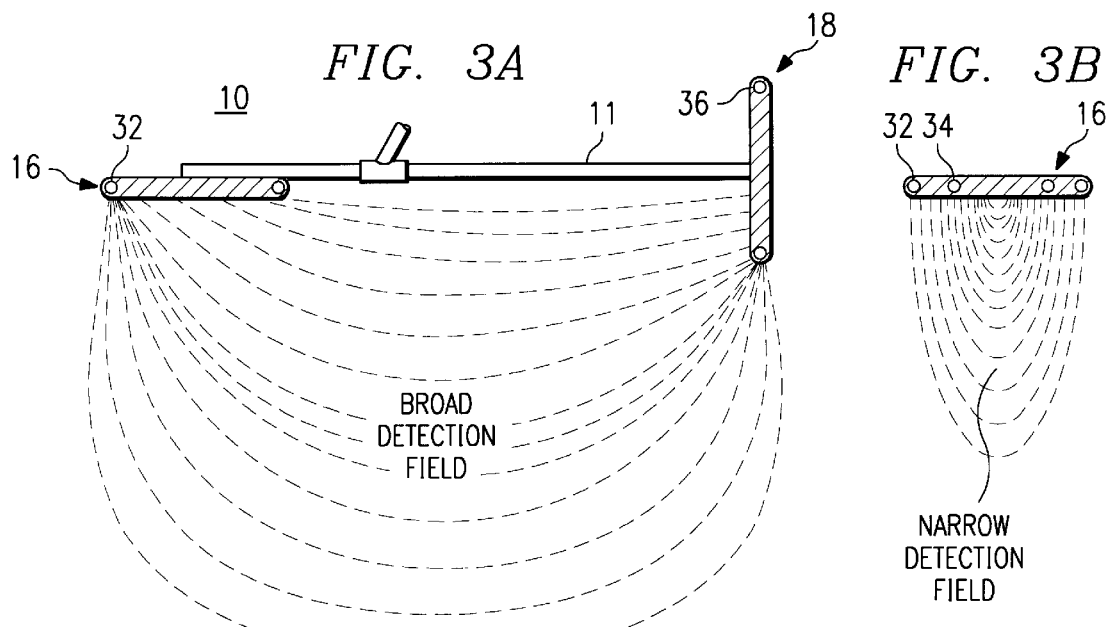
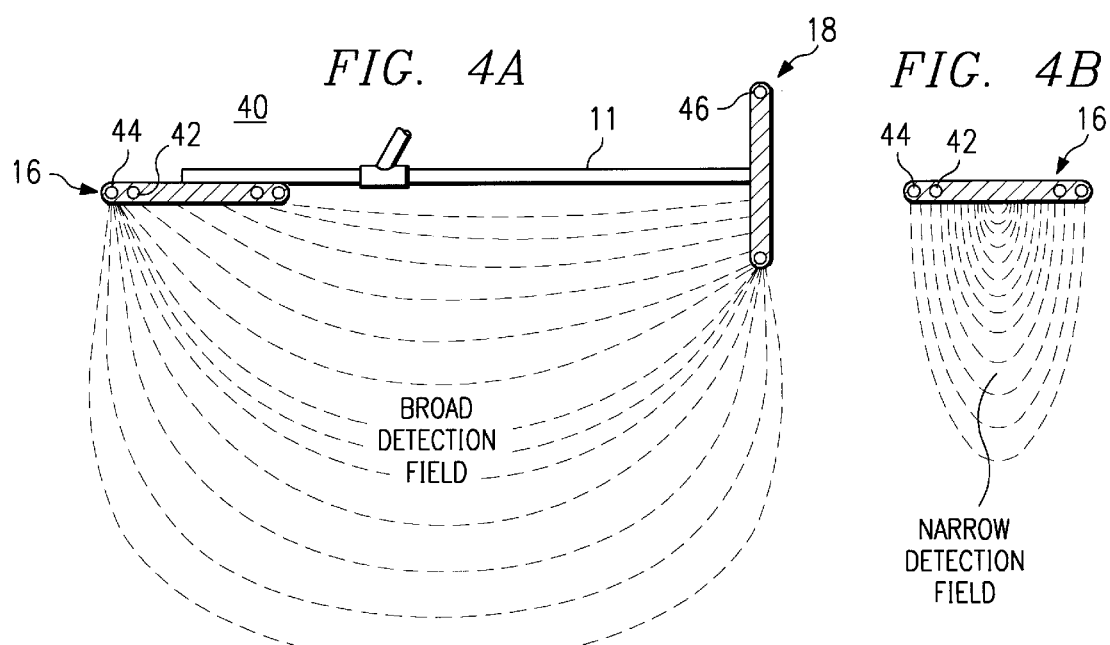

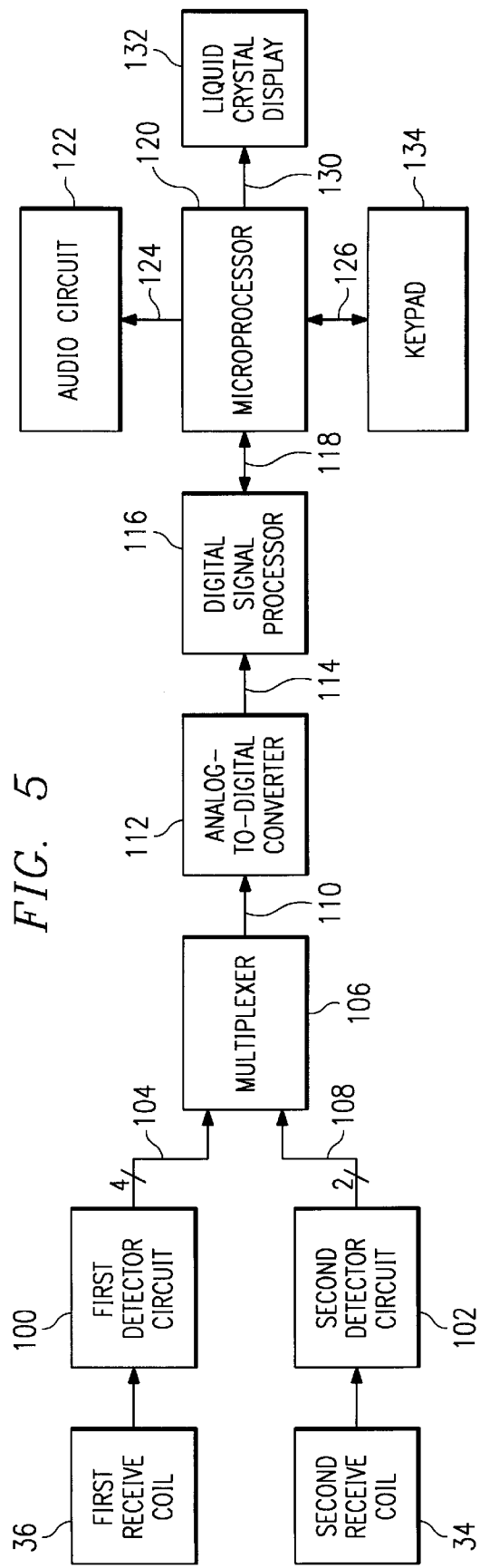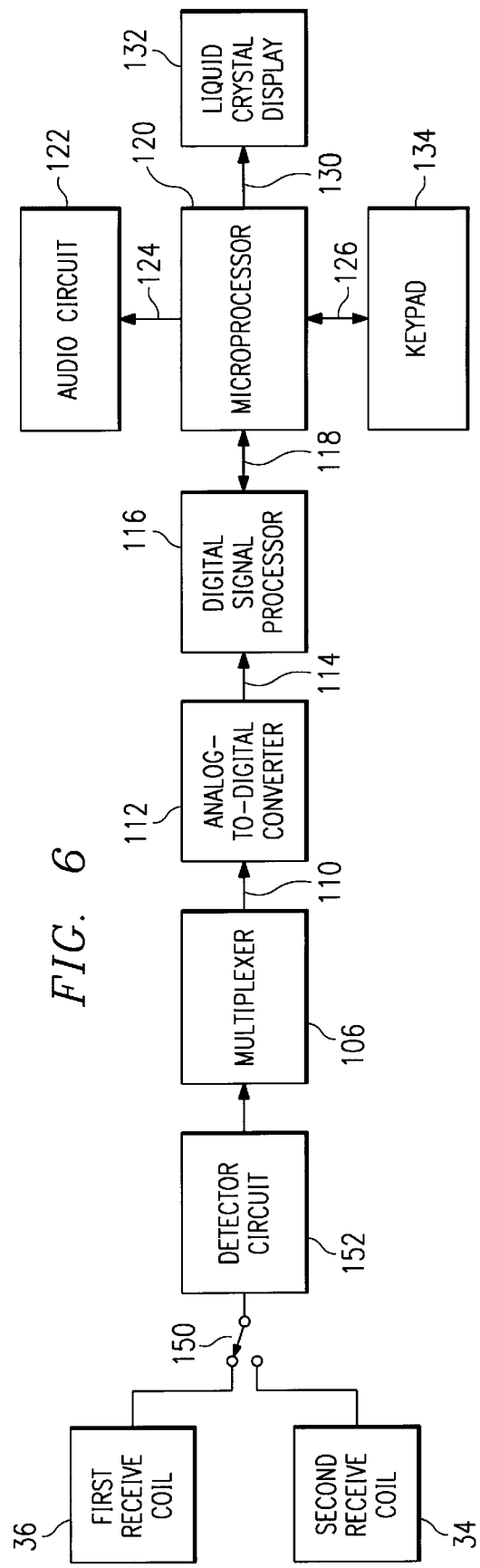

DUAL FIELD METAL DETECTOR

TECHNICAL FIELD OF THE INVENTION

The present invention pertains in general to metal detectors, and in particular to a metal detector which has multiple detection fields.

BACKGROUND OF THE INVENTION

Metal detectors are typically operated using a transmit coil and a receive coil within a single coil assembly. However, the transmit and receive coils can be spatially separated into two different coil assemblies or boxes. In the metal detector industry, this arrangement is commonly referred to as a two-box coil system. An example of a two-box system is shown in Design Patent D274,704 which is assigned to Garrett Electronics. The two-box coil system is very effective in detecting large, deep targets because the coil arrangement utilized by the two-box system results in a detection field much larger than the individual fields of the two coils which constitute the two-box system. However, as a result of this large detection field it is very difficult to locate the target with precision. Therefore, it is a common practice to operate the two-box detector in conjunction with an additional detector having a standard search coil which has a much more limited detection field. In this practice, the two-box detector is used for the primary searching of an area and once the two-box detector has approximately located a target, a second detector with a standard search coil is utilized to locate the target with more precision. This practice has the disadvantage of requiring the use of multiple metal detectors.

SUMMARY OF THE INVENTION

A selected embodiment of the present invention is a dual field metal detector which includes a transmit coil and a first receive coil that is positioned offset from the transmit coil such that the first receive coil does not overlap the transmit coil. The transmit coil and the first receive coil define a first detection field. A second receive coil is positioned such that it at least partially overlaps the transmit coil. The transmit coil and the second receive coil define a second detection field which is smaller than the first detection field and is substantially encompassed within the first detection field. A frame supports the transmit and receive coils. A metal detector circuit is connected to the transmit and receive coils for detecting the presence of metal objects in the detection fields.

A further aspect of the present invention is a dual field metal detector which has two transmit coils and one receive coil and likewise produces first and second detection fields.

In use, the operator can scan a large area quickly by use of the large first detection field. When an object is detected, the operator can switch to the narrow second detection field to more precisely locate the object.

BRIEF DESCRIPTION OF THE DRAWINGS

For a more complete understanding of the present invention and the advantages thereof, reference is now made to the following detailed description taken in conjunction with the accompanying drawings in which:

FIG. 2 is a partial sectional, elevation view of detector 10 illustrating a single transmit coil and two receive coils as shown in FIG. 1, FIGS. 3A and 3B illustrate respectively the first and second detection fields generated by a first embodiment of the dual field detector of the present invention, FIGS. 4A and 4B illustrate a second embodiment of the present invention which has two transmit coils and one receive coil and these Figures show the detection fields produced by this configuration, FIG. 5 is a block diagram for the electronic circuits for the detector 10 shown in FIG. 1 in which there are two detection channels, and FIG. 6 is a block diagram for an alternate electronic configuration having a single detection channel and a switch for selecting the desired detection field.

DETAILED DESCRIPTION

Figure 1:
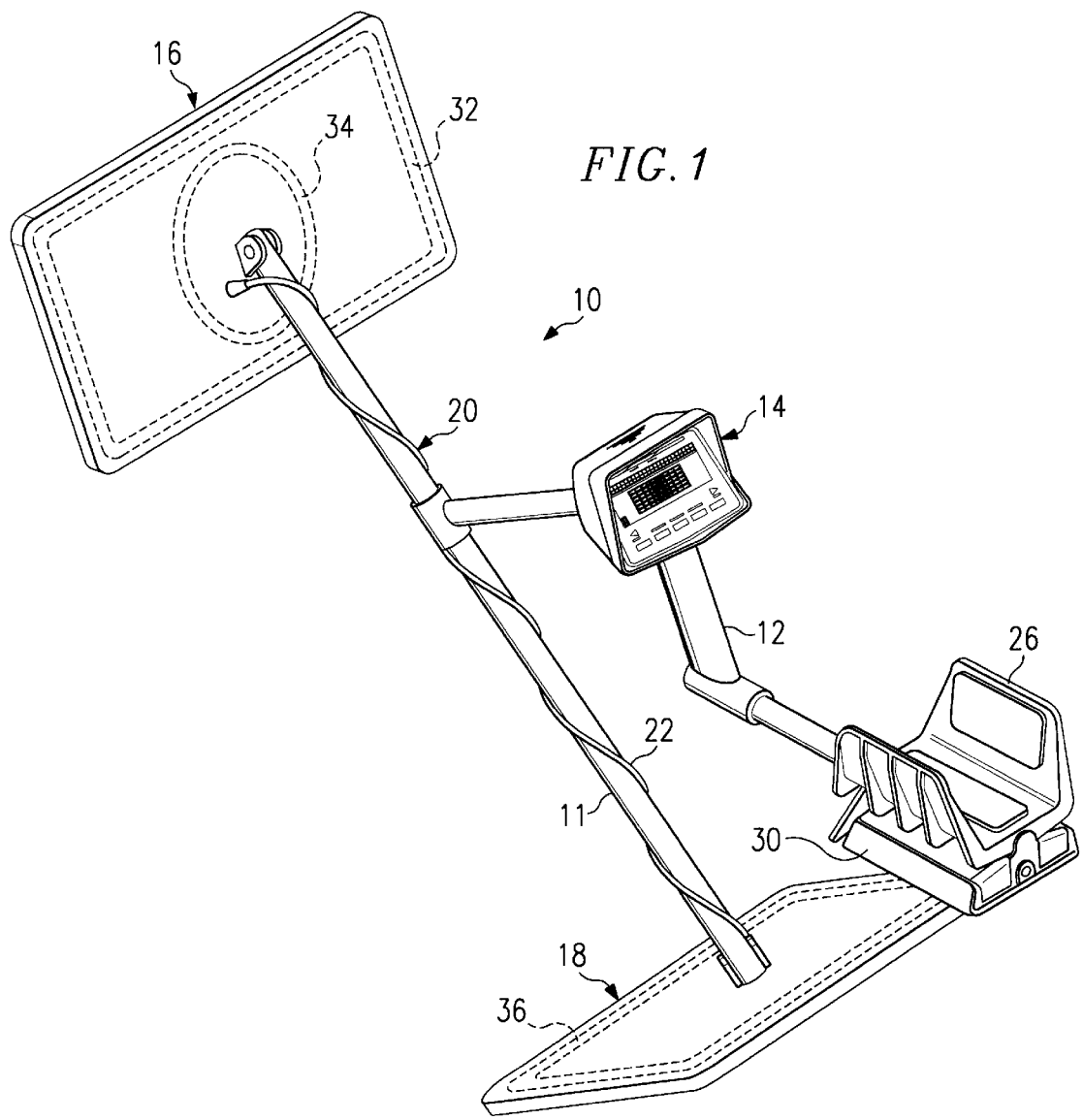
FIG. 1 is a perspective view of a preferred embodiment of a hand-held metal detector in accordance with the present invention.

Referring to FIGS. 1 and 2, there is illustrated a hand-held metal detector 10 in accordance with the present invention which is designed to search for metal objects that are generally out of sight and buried beneath the surface of the earth. The detector 10 includes a stem 11, a hand grip 12 and a housing 14 which includes metal detection circuitry. The stem 11 is a frame for the detector 10. The detector 10 further includes rectangular search heads 16 and 18. Transmit and receive coils in head 16 are connected via a cable 20 to the electronics housing 14. A receive coil in head 18 is connected via cable 22 to the housing 14. The cables can optionally be positioned within the stem 11. The detector 10 includes an arm rest 26 and a battery pack 30.

The search head 16 is perpendicular to the search head 18. In use, the search head 16 is positioned parallel to the surface of the ground.

Search head 16 includes a rectangular transmit coil 32 and an elliptical receive coil 34. Search head 18 has only a rectangular receive coil 36.

In the preferred embodiment of the present invention the rectangular transmit coil 32 and rectangular first receive coil 36 have dimensions of 11 by 15 inches and the elliptical second receive coil 34 has dimensions of 8 by 10 inches. However, these coils may also be circular.

Transmit coil 32 and receive coils 34 and 36, shown in FIG. 1, are illustrated in further detail in the coil configuration shown in FIG. 2. The receive coil 34 is coaxial and coplanar with the transmit coil 32. The first receive coil 36 is offset from the transmit coil 32 so that there is no overlap. Overlap in this sense means that no part of the first receive coil 36 is located above, below or within the transmit coil 32. The second receive coil 34, however, does overlap the transmit coil 32. The positioning of the receive coil 36 offset from the transmit coil 32 produces a relatively broad detection field, as further described in reference to FIG. 3A. A preferred spacing between the center of head 16 and the center of head 18 is 36 inches. As shown in FIG. 2, the distance between transmit coil 32 and receive coil 34 is substantially less than the distance between transmit coil 32 and receive coil 36. Transmit coil 32 may be either co-planar with the receive coil 34 or offset. The offset may be lateral or vertical.

Each of the receive coils 34 and 36 is inductively balanced with the transmit coil 32. As a result, when the transmit coil 32 is activated by an alternating signal, there is essentially no output signal produced from the receive coils when there is no target within the detection fields. However, when a conductive or inductive target is located within the detection fields, the coil coupling is unbalanced and a signal is produced in one or both of the receive coils.

The detection fields produced by the metal detector 10 shown in FIGS. 1 and 2 are illustrated in FIGS. 3A and 3B. When the transmit coil 32 is used in conjunction with the laterally offset nonoverlapping receive coil 36, there is produced a broad detection field as shown in FIG. 3A. This broad field has essentially the same length as the overall metal detector 10. The depth of penetration into the earth of the field is somewhat proportional to the length of the field. The width of the detection field is somewhat greater than the width of the corresponding transmit and receive coils. Therefore, a substantially broad detection field is produced by the combination of coils 32 and 36. When a metal object is encountered within the broad detection field, and this object alters the coupling of the coils, a signal is produced in the receive coil 36 indicating that the object is located somewhere within the broad detection field.

When the transmit coil 32 is used in conjunction with the nearby, overlapping receive coil 34, a narrow detection field is produced as shown in FIG. 3B. The much narrower field is produced as a result of the close proximity of the coils 32 and 34. An output signal will be produced in the receive coil 34 when a metal object is located within the narrow detection field and the object causes an alteration of the coupling between coils 32 and 34.

The narrow detection field is substantially encompassed by the broad detection field and is located at one end of the broad detection field.

In operation, an operator performs a broad search using the transmit coil 32 in conjunction with the receive coil 36 to produce the broad detection field, as shown in FIG. 3A. This allows the operator to quickly cover a large search area and increases the probability that an object will be detected and not missed, as could happen with a narrow detection field. When the operator receives an indication that an object has been detected in the broad detection field, the operator can then switch the detector 10 to the narrow detection field which uses only the transmit coil 32 in conjunction with the receive coil 34. The operator will know that the object previously detected is somewhere within the broad detection field. The operator can then scan by use of coils 32 and 34 in the search head 16, with its narrow detection field, back and forth to cover the area indicated by the broad detection field, and when the object is encountered, which produces an output signal to the operator, the operator will know a more specific area location for the detected object. The operator can then excavate the detected object with much less effort than would be required for physically searching for the object within the broad detection field.

A further embodiment of the present invention is a metal detector 40 as illustrated in FIGS. 4A and 4B. The detector 40 is substantially the same as the detector 10 described in reference to FIG. 1, but instead has two transmit coils and one receive coil. Similar elements in detector 40 are described with common reference numerals with those of detector 10. The detector 40 has search heads 16 and 18. The search head 16 includes a transmit coil 42 and a receive coil 44. It further includes a search head 18 which has a transmit coil 46. As shown in FIG. 4A, the combination of the transmit coil 46 together with the receive coil 44 produces a broad detection field which is essentially the same size and configuration of the broad detection field produced for the metal detector 10 illustrated in FIG. 3A. As shown in FIG. 4B, the combination of the transmit coil 42 and receive coil 44 produces a narrow detection field which has essentially the same configuration as the narrow detection field shown in FIG. 3B for the detector 10. The dimensions and configuration of the detector 40 are essentially the same as that for the detector 10. The detector 40 coils which are in the same locations as in detector 10 have the same size and configurations.

The present invention as shown in FIG. 1 can be implemented by the use of circuitry to concurrently detect the received signals in the receive coils 34 and 36 (FIG. 5) or to alternately detect the received signals in the coils 34 and 36 (FIG. 6).

Referring to FIG. 5, the first receive coil 36 is connected to a first detector circuit 100, the output of which is provided through a line 104 to a multiplexer 106. The output from second receive coil 34 is provided through a second detector circuit 102 and then through a line 108 to the multiplexer 106. The selected input from either line 104 or 108 is provided through line 110 to an analog-to-digital converter 112. The output from converter 112 is transmitted through a line 114 to a digital signal processor 116. The signals produced by the processor 116 are then provided to a microprocessor 120 which produces a signal through a line 124 for driving an audio circuit 122, produces a display signal through a line 130 to a liquid crystal display 132 and is interconnected through a line 126 to a keypad 134. The details of electronic circuitry to provide the processing of signals for detecting a metal object is further described in application Ser. No. 08/541,034 entitled "Metal Detector for Identifying Target Electrical Characteristics, Depth and Size" which was filed on Oct. 6, 1995, and is now U.S. Pat. No. 5,721,489. This application is incorporated herein by reference.

As shown in FIG. 5, the multiplexer 106 can operate at such a speed that the receive coils 34 and 36 are effectively being used at the same time and the operator can view one or the other of the response signals, or both signals at one time if a display is provided to do so.

Referring now to FIG. 6, like reference numerals are used to refer to similar items as described in FIG. 5. The receive coils 34 and 36 are used alternately by means of a switch 150, which is manipulated by the operator. The output of the switch 150 is provided to a detector circuit 152 and the remainder of the signal processing is performed as previously described and as shown in the incorporated reference.

For the detector 40 shown in FIGS. 4A and 4B, the receive coil 44 can be connected directly to the detector circuit 152 as shown in FIG. 6. The transmit coils 46 and 42 are activated one at a time to produce the broad and narrow detection fields, respectively.

Each of the embodiments described herein for a metal detector can determine the target size and depth by implementing and using the circuitry and procedures described in the above-referenced Ser. No. 08/541,034, which has been incorporated herein by reference.

The embodiments described for the present invention are inductively balanced metal detectors, but the present invention can also be used with a pulse metal detector circuit as well.

Although multiple embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

What we claim is:

1. A dual field metal detector, comprising:
    a transmit coil,
    a first receive coil positioned offset from said transmit coil such that said first receive coil does not overlap said transmit coil, said first received coil is not coplanar with said transmit coil, said first receive coil is not in a plane that is parallel to a plane that has said transmit coil therein, and said first receive coil is not coaxial with said transmit coil, wherein said transmit coil and said first receive coil define a first detection field, a second receive coil positioned such that said second receive coil at least partially overlaps said transmit coil, wherein said transmit coil and said second receive coil define a second detection field which is smaller than said first detection field and is substantially encompassed within said first detection field, a frame supporting said transmit and said receive coils, and a metal detector circuit connected to said transmit and said receive coils for detecting the presence of metal objects in said detection fields.

2. A dual field metal detector as recite in claim 1 wherein said first detection field is elongate, said second detection field is positioned substantially at one end of said first detection field.

3. A dual field metal detector, comprising:

a transmit coil, a first received coil positioned offset from said transmit coil such that said first receive coil does not overlap said transmit coil, wherein said transmit coil and said first received coil defined a first detection field, a second receive coil positioned such that said second receive coil at least partially overlaps said transmit coil, wherein said transmit coil and said second receive coil define a second detection field which is smaller than said first detection field and is substantially encompassed within said first detection field and wherein said first receive coil is positioned perpendicular to said second receive coil, a frame supporting said transmit and said receive coils, and a metal detector circuit connected to said transmit and said receive coils for detecting the presence of metal objects in said detection fields.

4. A dual field metal detector, comprising:

a transmit coil, a first receive coil positioned offset from said transmit coil such that said first receive coil does not overlap said transmit coil, wherein said transmit coil and said first receive coil define a first detection field, wherein said transmit coil is perpendicular to said first receive coil, a second receive coil positioned such that said second receive coil at least partially overlaps said transmit coil, wherein said transmit coil and said second receive coil define a second detection field which is smaller than said first detection field and is substantially encompassed within said first detection field, a frame supporting said transmit and said receive coils, and a metal detector circuit connected to said transmit and said receive coils for detecting the presence of metal objects in said detection fields.

5. A dual field metal detector as recited in claim 1 wherein said transmit coil and said second receive coil are coplanar and coaxial.

6. A dual field metal detector as recited in claim 1 wherein said transmit coil and said first receive coil are rectangular.

7. A dual field metal detector as recited in claim 1 wherein said second receive coil is elliptical.

8. A dual field metal detector as recited in claim 1 wherein said metal detector circuit has two signal processing channels which are respectively connected to receive signals from said first and second receive coils.

9. A dual field metal detector as recited in claim 1 wherein said metal detector circuit has one signal processing channel and further includes a switch for selectively coupling said signal processing channel to either said first receive coil or said second receive coil.

10. A dual field metal detector as recited in claim 1 wherein said metal detector circuit includes circuitry for detecting the size and depth of a one of said metal objects.

11. A dual field metal detector, comprising:

a receive coil, a first transmit coil positioned offset from said receive coil such that said first transmit coil does not overlap said receive coil, wherein said receive coil and said first transmit coil define a first detection field, a second transmit coil positioned such that said second transmit coil at least partially overlaps said receive coil, wherein said receive coil and said second transmit coil define a second detection field which is smaller than said first detection field and is substantially encompassed within said first detection field, a frame supporting said receive and said transmit coils, and a metal detector circuit connected to said receive and said transmit coils for detecting the presence of metal objects in said detection fields.

12. A dual field metal detector as recited in claim 11 wherein said first detection field is elongate, said second detection field is positioned substantially at one end of said first detection field.

13. A dual field metal detector as recited in claim 11 wherein said first transmit coil is positioned perpendicular to said second transmit coil.

14. A dual field metal detector as recited in claim 11 wherein said receive coil is perpendicular to said first transmit coil.

15. A dual field metal detector as recited in claim 11 wherein said receive coil and said second transmit coil are coplanar and coaxial.

16. A dual field metal detector as recited in claim 11 wherein said receive coil and said first transmit coils are rectangular.

17. A dual field metal detector as recited in claim 11 wherein said second transmit coil is elliptical.

18. A dual field metal detector as recited in claim 11 wherein said metal detector circuit includes circuitry for detecting the size and depth of a one of said metal objects.

* * * * *

UNITED STATES PATENT AND TRADEMARK OFFICE
CERTIFICATE OF CORRECTION

PATENT NO : U.S. Patent No. 5,969,528
DATED : October 19, 1999
INVENTOR(S): Brent Charles Weaver It is certified that error appears in the above-identified patent and that said Letters Patent are hereby corrected as shown below:

Column 5, line 25 (claim 3, line 3), delete "received", and insert --receive--.

Column 5, line 28 (claim 3, line 6), delete "received", and insert --receive--.

Column 5, line 28 (claim 3, line 6), delete "defined", and insert --define--.

Signed and Sealed this

Twenty-second Day of May, 2001

*Attest:*

NICHOLAS P. GODICI

*Attesting Officer*    *Acting Director of the United States Patent and Trademark Office*